(12) United States Patent
Heinemann et al.

(10) Patent No.: US 11,209,328 B2
(45) Date of Patent: Dec. 28, 2021

(54) MEASURING THE ELECTRODE FORCE OF WELDING TONGS

(71) Applicant: Matuschek Messtechnik GmbH, Alsdorf (DE)

(72) Inventors: Axel Heinemann, Aachen (DE); Christoph Pierednik, Aachen (DE); Elmar Lange, Gummersbach (DE)

(73) Assignee: Matuschek Messtechnik GmbH, Alsdorf (DE)

( * ) Notice: Subject to any disclaimer, the term of this patent is extended or adjusted under 35 U.S.C. 154(b) by 24 days.

(21) Appl. No.: 16/646,288

(22) PCT Filed: Sep. 6, 2018

(86) PCT No.: PCT/EP2018/074025
§ 371 (c)(1),
(2) Date: Mar. 11, 2020

(87) PCT Pub. No.: WO2019/052892
PCT Pub. Date: Mar. 21, 2019

(65) Prior Publication Data
US 2020/0284673 A1    Sep. 10, 2020

(30) Foreign Application Priority Data

Sep. 12, 2017    (DE) .......................... 102017121095.4

(51) Int. Cl.
*G01L 5/00*    (2006.01)
*B23K 11/11*    (2006.01)
(Continued)

(52) U.S. Cl.
CPC ............ *G01L 5/009* (2013.01); *B23K 11/115* (2013.01); *B23K 11/3009* (2013.01);
(Continued)

(58) Field of Classification Search
CPC ... B23K 11/3009; B23K 37/02; B23K 11/115; G01L 5/009; G01L 1/16; G01L 1/22
See application file for complete search history.

(56) References Cited

U.S. PATENT DOCUMENTS 4,831,228 A     5/1989  Schumacher
6,156,992 A *  12/2000  Besslein ............... B23K 11/115
                                                        219/109
(Continued)

FOREIGN PATENT DOCUMENTS

CN        102626924 A    8/2012
CN        102886595 A    1/2013
(Continued)

OTHER PUBLICATIONS

Andreas Kugi, et al., "Modellbildung", Dec. 31, 2013, XP055367696, http://www.acin.tuwien.ac.at/fileadmin/cds/lehre/mblg/Archiv/Modellbildung_2013.pdf, Machine Translation.

*Primary Examiner* — Octavia Hollington
(74) *Attorney, Agent, or Firm* — Muirhead and Saturnelli, LLC

(57) ABSTRACT

The invention relates to a method for measuring the electrode force on welding tongs. The welding tongs have a first electrode arm with a first electrode and a second electrode arm with a second electrode, said second electrode arm lying opposite the first electrode arm. At least one workpiece is clamped between the electrodes during the welding process. The aim of the invention is to provide a method for measuring the electrode force, said method providing an improved signal quality. The method has the following steps: a) measuring a first force acting on the first electrode, b) measuring a second force acting on the second electrode, and c) adding the measured first force and the measured second force, wherein an electrode force signal transmitted from the welding point to the electrodes is amplified, and an (Continued)

interference force signal introduced into the at least one workpiece from the outside and transmitted to the electrodes is eliminated.

20 Claims, 2 Drawing Sheets

(51) Int. Cl.
*B23K 11/30* (2006.01)
*B23K 37/02* (2006.01)
*G01L 1/16* (2006.01)
*G01L 1/22* (2006.01)

(52) U.S. Cl.
CPC ............... *B23K 37/02* (2013.01); *G01L 1/16* (2013.01); *G01L 1/22* (2013.01)

(56) References Cited

U.S. PATENT DOCUMENTS

| | | | | |
|---|---|---|---|---|
| 6,359,249 B1* | 3/2002 | Brown | ................. | B21D 39/021 |
| | | | | 219/86.31 |
| 8,249,746 B2* | 8/2012 | Hagenauer | ............ | B25J 9/1633 |
| | | | | 700/250 |
| 8,680,423 B2* | 3/2014 | Binder | ................. | B23K 11/253 |
| | | | | 219/90 |
| 8,993,918 B2* | 3/2015 | Sakai | .................... | B23K 11/115 |
| | | | | 219/86.22 |
| 9,120,174 B2* | 9/2015 | Birner-Such | ......... | B23K 11/256 |
| 2005/0082340 A1 | 4/2005 | Wiedemann et al. | | |
| 2012/0197573 A1 | 8/2012 | Pecher | | |
| 2013/0020288 A1 | 1/2013 | Moision et al. | | |
| 2014/0291300 A1 | 10/2014 | Amagata | | |

FOREIGN PATENT DOCUMENTS

| | | |
|---|---|---|
| CN | 104070278 A | 10/2014 |
| DE | 38 33 287 A1 | 4/1989 |
| DE | 103 38 176 A1 | 3/2005 |
| DE | 103 53 478 B3 | 7/2005 |
| DE | 10 2008 039 872 A1 | 3/2010 |
| DE | 10 2009 049 329 A1 | 4/2011 |
| EP | 1 508 396 B1 | 1/2007 |
| JP | 2002-096177 A | 4/2002 |
| WO | WO 03/008145 A1 | 1/2003 |
| WO | WO 03/008146 A1 | 1/2003 |
| WO | WO 2014/095334 A1 | 6/2014 |

* cited by examiner

MEASURING THE ELECTRODE FORCE OF WELDING TONGS

TECHNICAL FIELD

The invention relates to a method for measuring an electrode force of welding tongs. In particular, the invention involves a method for capturing the force acting between electrodes and the object to be welded during resistance welding and spot welding. The invention also relates to welding tongs.

BACKGROUND OF THE INVENTION

In order to monitor the quality of a process of welding a workpiece, the force acting on the welding electrodes is usually measured in addition to further parameters such as welding current and welding voltage. The electrodes are fastened to welding tongs and, for welding, are pressed against the workpiece with a predefined force. This clamping force is intended to be captured during welding.

The document DE 103 38 176 A1 discloses a method and a device for controlling the pressing force of welding tongs, wherein the force applied by the welding tongs is measured by means of force sensors fitted to the welding tongs and is compared with a desired setpoint force. In the event of a discrepancy, an electric motor for driving the welding tongs can be accordingly readjusted, for example.

SUMMARY OF THE INVENTION

The system described herein provides a method for measuring an electrode force which provides an improved signal quality.

An embodiment of the system described herein provides a method for measuring an electrode force on welding tongs which have a first electrode arm with a first electrode and a second electrode arm which is opposite the first electrode arm and has a second electrode. At least one workpiece may be clamped between the first electrode and the second electrode during the welding process. The method may include: a) measuring a first force acting on the first electrode, b) measuring a second force acting on the second electrode, and c) adding the measured first force and the measured second force, wherein an electrode force signal transmitted from the welding point to the electrodes is amplified and a disturbance force signal introduced into the at least one workpiece from the outside and transmitted to the electrodes is eliminated.

In some embodiment, an aim of the method according to the system described herein is to separate the signals on account of the clamping force of the electrodes from the signals of the forces applied to the workpiece from the outside. The electrode force or clamping force, which, starting from a tongs drive, acts on a workpiece to be welded via the electrode arms and the electrodes, generates outwardly acting forces on the surface of the first electrode and on the surface of the second electrode, i.e., forces which act on the electrode surfaces in the axial direction of the electrode axes toward the electrode holders on the tongs.

Any disturbance force $F_s$, which is caused, for example, by a movement or vibration introduced into the workpiece from the outside, moves the workpiece toward one electrode and away from the other electrode and thus increases the force $(+F_s)$ on the surface of one electrode and reduces the force $(-F_s)$ on the surface of the other electrode. The magnitudes of the disturbance forces $(+F_s$ and $-F_s)$ are the same on both electrodes. Such disturbance forces usually occur during simultaneous welding with a plurality of welding tongs acting on the workpiece or on account of other tools or transport devices which move the workpiece. In this case, the disturbance forces are superimposed on the actual force signal occurring during welding and reduce the signal quality.

If the first force, which acts on the surface of the first electrode, and the second force, which acts on the surface of the second electrode, are added, the respective electrode forces are added on account of having the same signs, and the disturbance forces cancel each other on account of having different signs. The signal of the sum of the two measured forces is then largely free of any disturbance forces introduced into the workpiece from the outside, and the signal of the sum of the two measured forces represents solely the welding force acting between the workpiece and the electrodes, wherein the amplitude of this signal has twice the value of the force acting on the individual electrode. The method according to the system described herein improves the signal quality by eliminating the disturbance signals and doubling the amplitude and can be carried out in a particularly simple manner by only carrying out a simple addition of two measured force signals.

In one practical embodiment of the method according to the system described herein, X-tongs are used as the welding tongs. X-tongs are used to reach welding points which are difficult to access. For this purpose, the electrode arms of X-tongs may extend over a considerable length at right angles to the electrode axis and have a low bending stiffness. The disturbance forces introduced into the workpiece from the outside can significantly distort the weak signal of the electrode force. The method according to the system described herein is particularly advantageous in conjunction with X-tongs because the relatively large disturbance force signals in X-tongs may be reduced or eliminated. The method described here also may improve the signal quality in C-tongs. In the case of X-tongs, the force signal may be captured by means of strain sensors on the tongs' arms. In the case of C-tongs, the force signal may be captured by means of pressure sensors, for example, piezo sensors on the electrode holders.

The first force may be measured in practice by means of at least one first sensor on the first electrode arm, and the second force may be measured by means of at least one second sensor on the second electrode arm. The first sensor and the second sensor each may be arranged in a region of the horizontally extending sections of the electrode arms. In particular, the first sensor and the second sensor may be arranged on those sides of the electrode arms which face away from the electrodes. The force acting axially on the electrodes may be detected particularly well on the electrode arms which extend transversely to the electrodes and are elastically deformed by the electrode force. Such deformation may be measured as length expansion on the convexly curved side of an electrode arm and as compression on the concavely curved side and may be converted into a force value. Alternatively, the sensors also may each be arranged directly in the region of the electrode holders, which may be fastened to the ends of the electrode arms, and may be in the form of pressure sensors.

It is also possible to use more than one sensor for each electrode, for example, one sensor on the outside of the electrode arm and a second sensor on the inside of the latter. Strain sensors on the tongs arm also may be combined with pressure sensors on the electrode holder or on the drive motors, which capture the torque equivalent to the electrode force.

A piezo sensor and/or a strain gage may be suitable, in particular, as sensors. A force-induced length change in the region of the electrode arms may be easily detected by means of a piezo sensor or a strain gage. Piezo sensors also may directly capture a pressure signal. Piezo sensors and strain gages are sensors which may be easily used. The sensors used should be calibrated such that they effect the same signal swing if the magnitude of the force acting on the electrode surface is the same.

The system described herein also relates to welding tongs having a first electrode arm with a first electrode and having a second electrode arm with a second electrode. At least one first sensor for measuring a force acting on the first electrode may be arranged on the first electrode arm, and at least one second sensor for measuring a force acting on the second electrode may be arranged on the second electrode arm. The measurement signals from the first sensor and from the second sensor may be passed to evaluation electronics and are added.

In this case, each sensor may measure a signal representative of the force generally acting on the electrode surface in the axial direction. In other words, the measured signal from each sensor may be converted, on the basis of fixed conversion rules, into a force which is axially introduced into the electrode. The sensor may be a piezo sensor on the electrode holder or on the electrode arm, which may emit a measurement signal proportional to the axial force on the electrode. However, the sensor also may be a strain-measuring element which measures the strain on the top side or on the underside of the electrode arm. A strain gage or again a piezo sensor, which may be fastened between two holding elements fastened to the surface of the electrode arm, is possible as the strain measuring element. It is also possible to provide different sensors for measuring the force on the two different electrodes of welding tongs. The measurement signals may be converted into absolute force values by calibrating the measurement sensors and their evaluation electronics.

The measured first force signal and the measured second force signal may be in practice passed to evaluation electronics for calculating the corrected force by means of a cable connection. Transmission by cable may be shielded well from the electromagnetic fields occurring during the welding process.

In one practical embodiment, the welding tongs according to the system described herein are X-welding tongs. As already explained above, the signal of the electrode force is relatively weak in elastically flexible X-welding tongs, with the result that the improvement in the signal quality by eliminating the disturbance signals is important.

In order to measure the electrode force, the at least one sensor may be arranged on the respective electrode arm at at least one of the following positions: in the region of a drive motor, in the region of a horizontally extending section, and in the region of an electrode holder.

The forces acting on the electrodes may be measured in each of these three regions. A force acting axially via the surface of the electrode may be transmitted by the electrode to the electrode holder and may be transmitted from the latter to the electrode arms which may be in turn held by the drive motor in the position pressed onto the workpiece. The force consequently may press on the electrode holder, elastically bend the tongs' arms and be held by the torque of the drive motor.

As already explained above, a piezo sensor and/or a strain gage may be used as sensors.

BRIEF DESCRIPTION OF THE DRAWINGS

Further practical embodiments and advantages of the system described herein are described below in connection with the drawings, in which.

DESCRIPTION OF VARIOUS EMBODIMENTS

Figure 1:
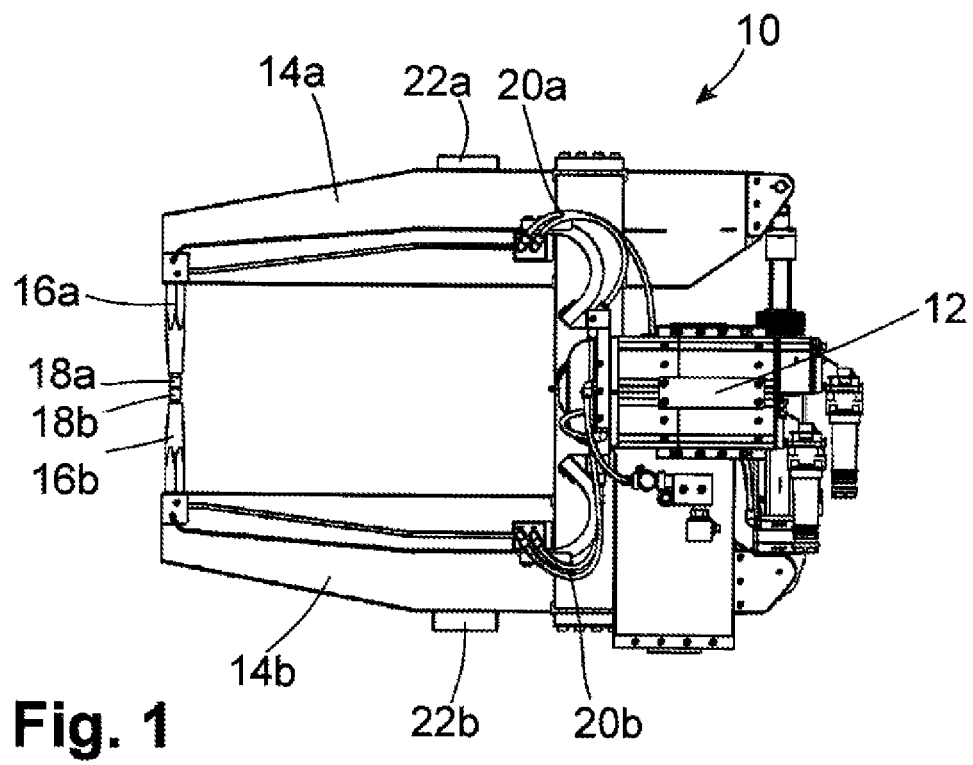
FIG. 1 shows a side view of welding tongs according to an embodiment of the system described herein.

FIG. 1 shows welding tongs 10 according to an embodiment the system described herein, in which the welding tongs 10 are X-tongs.

Starting from a drive motor 12, a first electrode arm 14a and a second electrode arm 14b may extend in the horizontal direction. The first electrode arm 14a and the second electrode arm 14b may be arranged opposite one another and run parallel to one another. A first electrode holder 16a having a first electrode 18a fastened to the latter may be arranged at the free end of the first electrode arm 14a, and a second electrode holder 16b having a second electrode 18b may be arranged on the second electrode arm 14b. The electrodes 18a, 18b may be used for the resistance welding or spot welding of a workpiece (not illustrated). The workpiece may consist of two or more metal sheets to be welded to one another. The electrode arms 14a, 14b may extend at right angles to the axes of the electrodes 18a, 18b.

The welding tongs also may have a plurality of connections, including a power connection 20 for the electrodes 18a, 18b.

A first sensor 22a may be arranged on the top side of a section of the first electrode arm 14a which is remote from the electrode 16a, and a second sensor 22b may be arranged on the underside of a section of the second electrode arm 14b which is remote from the electrode 16b. In the present case, the first sensor 22a and the second sensor 22b each may be a piezo sensor which may be used to measure the elastic sag of the electrode arms 14a, 14b. A corresponding force signal may be determined from the measurement signal.

Figure 2:
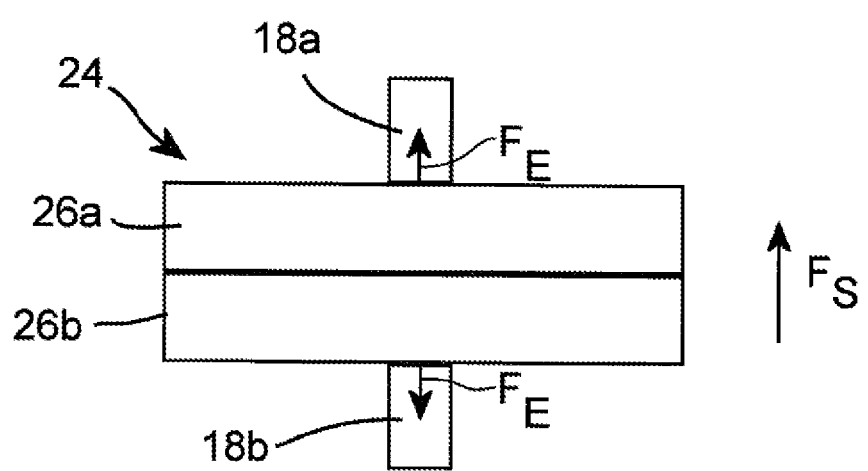
FIG. 2 shows a schematic illustration of the forces acting on the electrodes of welding tongs, according to an embodiment of the system described herein.

The method according to the system described herein is described below in connection with FIG. 2. Only the first electrode 18a and the second electrode 18b are depicted in FIG. 2. A workpiece 24 to be welded may be clamped between the first electrode 18a and the second electrode 18b. The workpiece 24 may include two metal sheets 26a and 26b to be welded to one another.

Starting from the drive motor 12, a permanent electrode force FE may be applied to the workpiece 24 during welding via the electrode arms 14a, 14b and via the surfaces of the electrodes 18a, 18b. The force FE may cause a specific elastic deformation of each of the two electrode arms 14a, 14b, which deformation may be measured by means of the first sensor 22a and the second sensor 22b and may be converted into a force value.

In contrast, an outer disturbance force $F_s$ caused by a movement of the workpiece 24 may act on the surfaces of the two electrodes 18a, 18b in the opposite direction. The disturbance force $F_s$ acting in the upward direction in FIG. 2 in the present case may cause the workpiece 24 to be moved in the direction of the first electrode 18a at the top and may cause the force on the first electrode 18a to increase, in which case the force on the second electrode 18b at the bottom is simultaneously reduced by the same magnitude. The sensors 22a, 22b may be calibrated in such a manner that compressive forces respectively acting on the surface of the electrode 18a, 18b arranged on the electrode arm 14a, 14b have the same sign. In such embodiments, the signal from the two sensors 22a, on account of the disturbance force $F_s$, therefore has an opposite sign. The signal components on account of the disturbance force $F_s$ consequently cancel each other when the two force values are added.

Figure 3:
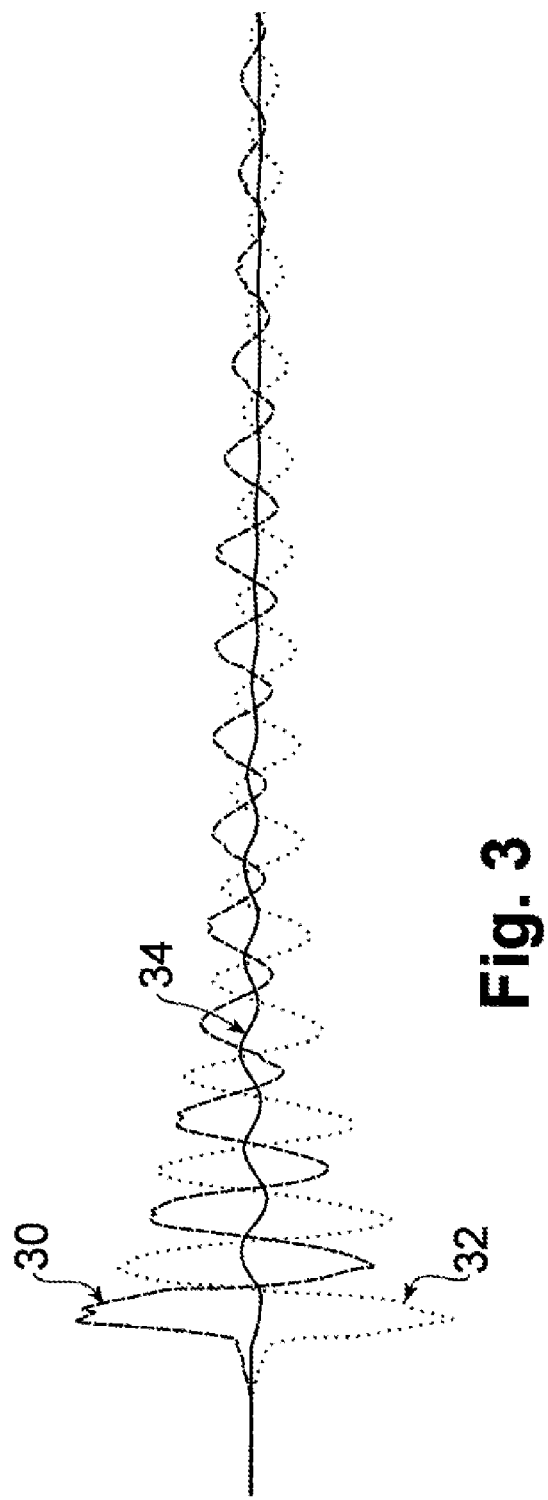
FIG. 3 shows a schematic illustration of the signals of the first electrode force and of the second electrode force and of the added electrode forces, according to an embodiment of the system described herein.

FIG. 3 illustrates a measurement from which this principle is clear, in accordance with an embodiment of the system described herein. Three lines are shown, wherein the first line 30 (dashed) corresponds to the measured first force at the first sensor 22a, the second line 32 (dotted) corresponds to the second force at the second sensor 22b, and the third line 34 (solid) corresponds to half the value of the added first force and second force.

As can be clearly seen, the first line 30 and the second line 32 do not have a constant force profile, but rather strong force fluctuations. These may be attributed to disturbance forces which act on the electrodes 14a, 14b from the outside via the workpiece 24 and may be measured by the first sensor 22a and the second sensor 22b. In the measurement illustrated in FIG. 3, a force pulse was applied to the workpiece from the outside and causes the workpiece to vibrate, and the first line 30 and the second line 32 have substantially opposite swings.

The third line 34 shows the sum of the first force (line 30) and the second force (line 32), wherein the sum was also divided by two in order to lie in the same range of values as the first line 30 and the second line 32. As can be clearly seen, the sum line 34 is substantially smoother and more constant than the first line 30 and the second line 32. On account of the opposite signs of the disturbance forces $F_s$, they cancel each other, and the electrode forces FE with the same sign are added.

The features of the system described herein which are disclosed in the present description, in the drawings and in the claims may be essential to the implementation of the system described herein in its various embodiments both individually and in any desired combinations. The invention is not restricted to the embodiments described herein, but may be varied within the scope of the claims and taking into account the knowledge of a relevant person skilled in the art. Other embodiments of the system described herein will be apparent to those skilled in the art from a consideration of the specification and/or an attempt to put into practice the system described herein disclosed herein. It is intended that the specification and examples be considered as illustrative only, with the true scope and spirit of the invention being indicated by the following claims.

The invention claimed is:

1. A method for measuring an electrode force on welding tongs during a welding process, wherein the welding tongs have a first electrode arm with a first electrode and a second electrode arm which is opposite the first electrode arm and has a second electrode, wherein at least one workpiece is clamped between the electrodes during the welding process, the method comprising:

measuring a first force acting on the first electrode during the welding process;

measuring a second force acting on the second electrode during the welding process;

cancelling a disturbance force caused by a movement or vibration introduced into the workpiece by adding the measured first force and the measured second to provide a total measured force, wherein an electrode force signal transmitted from a welding point to the electrodes is amplified and a disturbance force signal introduced into the at least one workpiece from the outside and transmitted to the electrodes is eliminated; and using the total measured force acting on the welding electrodes to monitor quality of the weld of the workpiece.

2. The method as claimed in claim 1, wherein X-tongs are used as the welding tongs.

3. The method as claimed in 2, wherein the first force is measured by at least one first sensor on the first electrode arm and wherein the second force is measured by at least one second sensor on the second electrode arm.

4. The method as claimed in claim 3, wherein the sensor is selected from the following group: piezo sensor, strain gage.

5. The method as claimed in claim 2, wherein the sensor is selected from the following group: piezo sensor, strain gage.

6. The method as claimed in 1, wherein the first force is measured by at least one first sensor on the first electrode arm and wherein the second force is measured by mans of at least one second sensor on the second electrode arm.

7. The method as claimed in claim 6, wherein the sensor is selected from the following group: piezo sensor, strain gage.

8. The method as claimed in claim 1, wherein the sensor is selected from the following group: piezo sensor, strain gage.

9. Welding tongs having a first electrode arm with a first electrode and having a second electrode arm with a second electrode wherein at least one first sensor for measuring a force acting on the first electrode is arranged on the first electrode arm wherein at least one second sensor for measuring a force acting on the second electrode is arranged on the second electrode arm and wherein the measurement signals from the first sensor and from the second sensor are passed to evaluation electronics that cancel a disturbance force caused by a movement or vibration introduced into a workpiece by adding a value for the force acting on the first electrode with a value for the force acting on the second electrode to provide a total measured force.

10. The welding tongs as claimed in claim 9, wherein the welding tongs are X-welding tongs.

11. The welding tongs as claimed in claim 10, wherein the at least one sensor is arranged on the respective electrode arm at at least one of the following positions:

in the region of a drive motor,
in the region of a horizontally extending section, and
in the region of an electrode holder.

12. The welding tongs as claimed in claim 11, wherein the sensor is selected from the following group: piezo sensor, strain gage.

13. The welding tongs as claimed in claim 10, wherein the sensor is selected from the following group: piezo sensor, strain gage.

14. The welding tongs as claimed in claim 10, wherein the total measured force is used to monitor quality of the weld of the workpiece.

15. The welding tongs as claimed in claim 9, wherein the at least one sensor is arranged on the respective electrode arm at at least one of the following positions:
- in the region of a drive motor,
- in the region of a horizontally extending section, and
- in the region of an electrode holder.

16. The welding tongs as claimed in claim 15, wherein the sensor is selected from the following group: piezo sensor, strain gage.

17. The welding tongs as claimed in claim 15, wherein the total measured force is used to monitor quality of the weld of the workpiece.

18. The welding tongs as claimed in claim 9, wherein the sensor is selected from the following group: piezo sensor, strain gage.

19. The welding tongs as claimed in claim 18, wherein the total measured force is used to monitor quality of the weld of the workpiece.

20. The welding tongs as claimed in claim 9, wherein the total measured force is used to monitor quality of the weld of the workpiece.

* * * * *